United States Patent [19]

Bade

[11] Patent Number: 4,787,156

[45] Date of Patent: Nov. 29, 1988

[54] SPORTS SHOE AND METHODS FOR MAKING THE SAME

[75] Inventor: Dieter Bade, Achim, Fed. Rep. of Germany

[73] Assignee: Kloeckner Ferromatik Desma GmbH, Achim, Fed. Rep. of Germany

[21] Appl. No.: 117,401

[22] Filed: Nov. 2, 1987

Related U.S. Application Data

[63] Continuation of Ser. No. 32,988, Mar. 30, 1987, abandoned, which is a continuation of Ser. No. 795,405, Nov. 6, 1985, abandoned.

[30] Foreign Application Priority Data

Nov. 7, 1984 [DE] Fed. Rep. of Germany ....... 3440567
Oct. 8, 1985 [DE] Fed. Rep. of Germany ....... 3535830

[51] Int. Cl.4 ........................ A43B 5/02; A43D 65/00; B29C 45/16
[52] U.S. Cl. .................................. 36/128; 12/142 T; 264/244; 425/129.1; 425/588
[58] Field of Search ............ 36/59 R, 134, 127, 67 R, 36/128; 12/142 RS, 142 P, 142 T; 264/244; 425/119, 129 S

[56] References Cited

U.S. PATENT DOCUMENTS

| 2,931,110 | 4/1960 | Pietrocola | 36/59 R |
|---|---|---|---|
| 3,315,317 | 4/1967 | Winkler | 425/119 |
| 3,410,005 | 11/1968 | Szerenyi | 264/244 |
| 3,447,251 | 6/1969 | Drexler | 264/244 |
| 3,522,632 | 8/1970 | Wessel | 425/119 |
| 3,523,333 | 8/1970 | Taylor et al. | 425/119 |
| 3,652,757 | 3/1972 | Wessel et al. | 264/244 |
| 4,120,477 | 10/1978 | Justamante | 264/244 |
| 4,165,958 | 8/1979 | Malburg et al. | 425/129 S |
| 4,286,936 | 9/1981 | Hustedt | 264/244 |
| 4,348,003 | 9/1982 | Beneteau | 425/129 S |

FOREIGN PATENT DOCUMENTS

| 2022118 | 8/1972 | Fed. Rep. of Germany . |
|---|---|---|
| 2161573 | 6/1973 | Fed. Rep. of Germany ..... 36/59 R |
| 2241493 | 6/1975 | Fed. Rep. of Germany . |
| 2806539 | 8/1979 | Fed. Rep. of Germany . |

Primary Examiner—Steven N. Meyers
Attorney, Agent, or Firm—Watson, Cole, Grindle & Watson

[57] ABSTRACT

A sports shoe such as a soccer shoe having an injection molded sole molded to an inner sole, the sole having open spaces and injection molded cleats molded to the inner sole.

5 Claims, 10 Drawing Sheets

SPORTS SHOE AND METHODS FOR MAKING THE SAME

This application is a continuation of application Ser. No. 032,988, filed Mar. 30, 1987, now abandoned, which is a continuation of application Ser. No. 795,405, filed Nov. 6, 1985, now abandoned.

BACKGROUND OF THE INVENTION

1. Field of the Invention

The present invention relates to a sports shoe, and more particularly to a soccer-style shoe, which has an injection molded sole that is molded to the inner sole and an injection molded cleats, as well as to methods and injection molds for manufacturing such a sports shoe.

2. The Prior Art

Known procedures for injection-molding and shaping material onto shoe uppers are used in the manufacture of sports shoes with injection-molded soles and injection-molded cleats as shown, for example, in German Patent No. 22 41 493 and German Patent No. 20 22 118. Injection molds used for these procedures include a bottom die and an additional counterpunch (if required), a last, and two side parts. The two side parts of the mold, in their closed position, limit the opening for the bottom die and counterpunch die. The last, after the uppers are attached, is placed onto the side parts of the, which are in the closed, position. The material for forming the soles is injected through sprue runners into the area of the opening which is defined by the side parts of the mold in their closed position, the bottom die and the counterpunch die or, respectively, the last with the attached uppers. The sole can consist of an outer sole, and an intermediate sole which are both formed in a special injection molding cycle.

Until now, sports shoes with an injection-molded sole and injection-molded cleats were made such that the cleats were first injection molded in a separate operation. Subsequently, the cleats were placed into recesses of a corresponding bottom die which subsequently worked together with the side parts of the mold and the last with the attached upper so that the cleats were placed against the inner sole of the sports or soccer shoe.

A soccer shoe or boot generally has at least three types of cleats which, until now, had to be inserted into the recesses of the bottom die with considerable manual effort. Furthermore, there was also a considerable storage problem for such cleats.

SUMMARY OF THE INVENTION

In one aspect, the subject invention is based on the realization that the considerable effort associated with the production, storage, and insertion of the cleats can be avoided if the sole and the cleats are made in one operation and then joined to the uppers or, respectively, the inner sole.

An object of the invention is to create a sports shoe, particularly a soccer shoe, having an injection-molded sole that is molded to an inner sole and having injection-molded cleats which are formed simultaneously and molded to the inner sole.

As used herein, the term soccer shoes includes soccer boots and sports shoes with an injection-molded sole which is molded to an inner sole and with injection-molded cleats in general, if such sports shoes have the kind of cleats customarily used for soccer shoes. Moreover, the invention pertains to cleats where the term also applies to such areas of the sole of shoes which are joined to the inner sole or, respectively, the uppers in the same manner as cleats.

Another object of the invention is to create a method for manufacturing such sports shoes, particularly soccer shoes.

The first object is achieved by providing the outer sole of a shoe with recesses which extend as far as the inner sole and molding the cleats in the area of the recesses to the inner sole by injection molding. This procedure avoids the need to store cleats, i.e., it is no longer necessary to maintain an inventory of cleats of different dimensions. The fact that a force-locking connection is assured between the cleats and the inner sole, as well as the cleats and the border area of the outer sole, is also a considerable advantage.

The second object may be achieved by a first method having an initial injection-molding cycle where the outer sole with recesses for the cleats is molded against the inner sole, and a second injection-molding cycle where the cleats are created and molded, in the area of the recesses, to the inner sole.

The second object may also be achieved by a second method having a first injection-molding cycle where the cleats are created and molded to the inner sole and a second injection-molding cycle wee the outer sole and the recesses for the cleats are created and molded to the inner sole.

In carrying out either method for the manufacture of sport shoes, an injection mold is used which, in accordance with the invention, has two side parts and a last, and for injection molding and shaping of the sole, has a bottom die with shapes complementing the cleats and, for the injection molding of the cleats, a bottom die with molds for the cleats. The two bottom dies are designed such that the sprue can be easily removed after the injection molding.

For carrying out the first method, a bottom die with the shape which complements the cleats is used first so that during an initial injection molding cycle, the outer sole is created with recesses for the cleats, and then subsequently a bottom die is used with a shape which then serves to create the cleats. In carrying out the second method, a bottom die with mold areas for creating and molding the cleats to the inner sole is used first, and the second injection molding cycle utilizes a bottom die with the mold areas which complement the cleats.

In accordance with the invention, the bottom die for injection molding and shaping the sole has a central sprue runner in the longitudinal direction of the sole area with tapered sprue runners leading from the central sprue runner to the area of the sole. These tapered sprue runners, in the simplest case, branch off the central sprue runner such that the axes of the tapered sprue runners intersect with the axis of the central sprue runner at a right angle. Because the sprue runners which branch off the central sprue runner taper down, it is very easy to pull the sprue from the bottom die manually, for instance, with the use of a tool such as a clamp.

To enable the sprue to be removed from the bottom die for the injection molding and shaping of the cleats after the corresponding molding cycle, this bottom die, in accordance with the invention, has a central sprue runner extending in the longitudinal direction of the sole area with channel sectors branching off on the same plane and the bottom die is divided into two parts at the center level of the central sprue runner and the sectors which branch off, so that tapered sprue runners, which begin at the branching sectors, lead to the walls of the molds. By dividing the bottom die for the injection molding and shaping of the cleats, it is possible to separate the two parts of the bottom die from each other such that the sprue with its branchings which is formed can easily be removed from the bottom die after the corresponding injection molding cycle.

To this end, in a further embodiment of the invention, one part of the divided bottom die includes a bolt which functions as a guide with stops for the other part and pressure springs are mounted on the bolts between the two parts. As a result, after the pressure exerted on the bottom die is removed, the two parts of the divided bottom die automatically separate from each other and thus the sprue can then be removed without difficulty.

In yet another embodiment of the invention, the side parts of the mold have a projection forming an abutment for the subdivided bottom die. As a result, the bottom die for the injection molding and shaping of the cleats pushes against this projection and by lowering the hydraulic pressure on the subdivided bottom die, the two parts separate from each other and the other part is forced against the projection as an abutment.

Thus, the invention simultaneously provides a procedure for removing the sprue formed in the injection molding of the cleats from the injection mold in which, after the production of the cleats, the hydraulic load of the subdivided bottom die is reduced, the second bottom die separates and the sprue is exposed for removal.

In addition, the choice of a particular sport soccer shoe for individual games generally is a function of the nature of the playing field. Depending on the particular requirements, greater or lesser flexibility of the soles may be desirable. Until now, the players chose from an appropriate selection of soccer boots. This represented a compromise insofar as the soles of familiar soccer boots all had greater or lesser flexibility.

Thus, a further aspect of the present invention is based, at least in part, on the realization that an optimum adaptation is achieved when the soles exhibit different flexibility in their individual areas as a result of which the number of soccer boots that need to be available can be reduced. Similar problems encountered with other types of shoes. For example, shoes which are comfortable for walking on pedestrian walkways are frequently uncomfortable on cross-country or similar paths. Thus, this aspect of the invention starts with the recognition that for such shoes, too, different flexibilities in various areas of the soles would greatly increase their suitability for comfortable walking and/or hiking trips. A further object of the invention therefore is to create a shoe, particularly a sports shoe such as a soccer shoe, in which different areas of the sole exhibit different flexibilities.

This object is achieved by providing shoes which have soles of injection-molded material which is molded to the upper and which have an outer sole and an inner sole, wherein the outer sole consists of different sections which are separated from one another and which are molded to the inner sole. In this manner, the intermediate areas between the sections of the outer sole determine the flexibility of the shoe sole. By having dimensions of the sections and the inbetween areas, the foot will move naturally while walking, which means that the foot naturally moves from the heel along the outer edges of the foot and the toe area in the direction of the big toe.

During the injection molding of the sole, a procedure can be used which lets the material of the inner sole reach the level of these sections so that no dirt can accumulate between the sections.

By an appropriate selection of material for the sections, the sections can be molded from material which has different colors from that of the inner sole and thus a cosmetic effect can also be achieved. For instance, the colors of the material for the inner sole and for the sections of the outer sole can be chosen such that they harmonize with currently fashionable colors for clothing.

For soccer boots with cleats, the object is achieved by injection molding one set of cleats together with an intermediate sole to be molded to the inner sole and by having the outer sole molded with the other cleats of which at least some should be molded to the inner sole of the uppers through openings provided in the intermediate sole.

The fitting of such soles to the uppers of soccer boots occurs, according to the invention, such that, in the initial injection molding cycle, one set of cleats and the intermediate sole is formed with the openings for the other cleats and molded to the inner sole and that in a second molding cycle, the sections of the outer sole are formed by inclusion of one set of cleats and molded to the inner sole and that the other cleats are formed simultaneously and molded to the inner sole in the area where the openings in the intermediate sole have been provided, to the extent that they are not merely connected to the sections.

The injection mold for carrying out this method, in accordance with the invention, comprises two side parts, a last, a bottom die for injecting and molding of the intermediate sole and its cleats and with the openings for the cleats of the outer sole sections, the bottom die having mold areas which complement the intermediate sole with its cleats and having complementing projections for the cleats of the sole sections, and another bottom die for injection molding and fitting of the outer sole sections and their cleats which has mold areas that complement the sole sections and their cleats, both bottom dies having a central sprue runner, in the center area of the central sprue runner, the dies are divided into two parts, and from each of the central sprue runners, sprue runners lead to the mold areas.

The injection mold consequently also has two bottom dies designed in accordance with the invention. The intermediate sole with cleats is therewith molded to the inner sole with which the intermediate sole forms a unit, whereby openings are simultaneously provided for the cleats of the sole sections, to the extent that they are connected to the inner sole.

The invention will be better understood by reference to the drawings taken in conjunction with the following discussion.

DETAILED DESCRIPTION OF THE PREFERRED EMBODIMENTS

Figure 1:
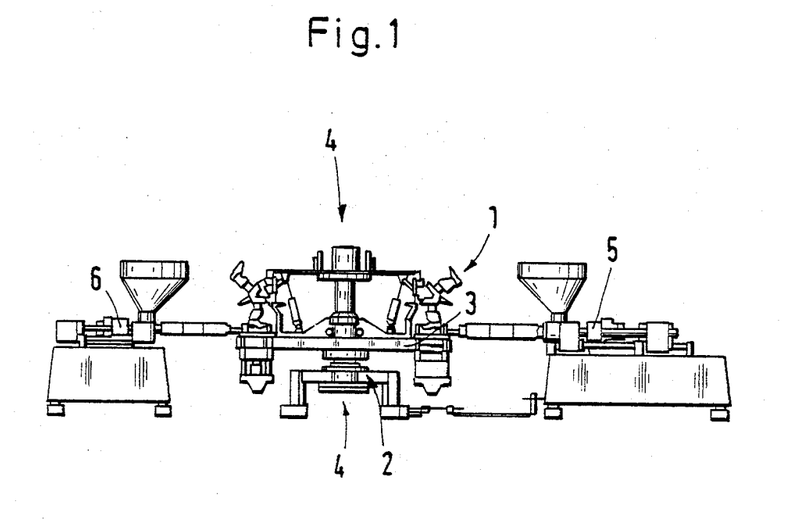
FIG. 1 is a side view of a device for molding soles and cleats to a sports shoe.

In FIG. 1, the illustrated device for molding soles and cleats to a sports shoe has a plurality of operating stations 1 arranged in a circle. Each station 1 comprises a fixed part attached to the fixed machine table 2 and a rotatable part 3 which moves around a circle (see FIG. 2). The rotatable part 3 is attached to a basically cylindrical machine construction which pivots on axis 4 in relation to the stationary table 2. The cyclical movement is controlled by means of stepping motors (not shown). The material for forming the soles is injected in the operating stations onto the shoe uppers by an injector 5 and the material for the cleats is injected by an injector 6.

Figure 2:
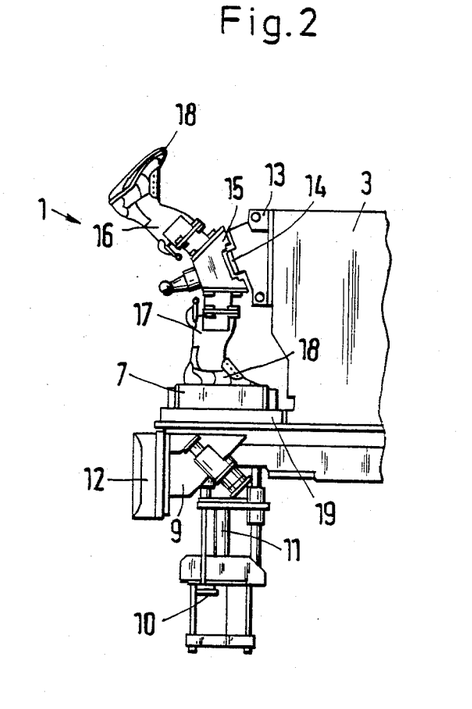
FIG. 2 is a detail from FIG. 1 showing an operating station.

FIG. 2 shows a portion of the device of FIG. 1. The stationary portion of the operating station 1 comprises two side parts 7 of the mold whose plane of separation is in the plane of the drawing, only one side part being illustrated for the sake of clarity. The two side parts 7 of the mold are constructed as mirror images at the level of the drawing and are shown in their closed position in which they supplement each other at the level of the drawing and define an opening. The side parts 7 of the mold in their closed position also define a recess which accommodates a projection of the bottom die or, respectively, bottom dies which are provided for carrying out the method in accordance with the invention.

A hydraulic operating cylinder 10, whose piston rod 11 is screwed to the bottom dies 12 and 19 of the injection mold, is flanged to the rotatable part 3 through a connection plate 9. The portion of the operating station 1 which pivots in a circle consists of a carriage guide 13 to which is attached a receiving part 15 which revolves around bolt 14. Part 15 is in the form of a truncated cone to which two lasts 16 and 17 are flanged, each last having attached uppers 18 of a sports shoe. The shoe upper 18 which is on the last 17 and is on the side parts 7 of the mold, is injected in the initial molding cycle of the outer sole with the formed recesses by using the bottom die 19. The cleats are formed with the bottom die 12. In carrying out one of the methods in accordance with the invention, the sole with the recesses is first injection molded by the injector 6 (FIG. 1) and then, by exchanging bottom die 19 for bottom die 12, the cleats are injected. In the method in which the cleats are to be molded first and then the sole, the cleats are first injected by the injector 5 and then the sole through injector 6.

Figure 3:
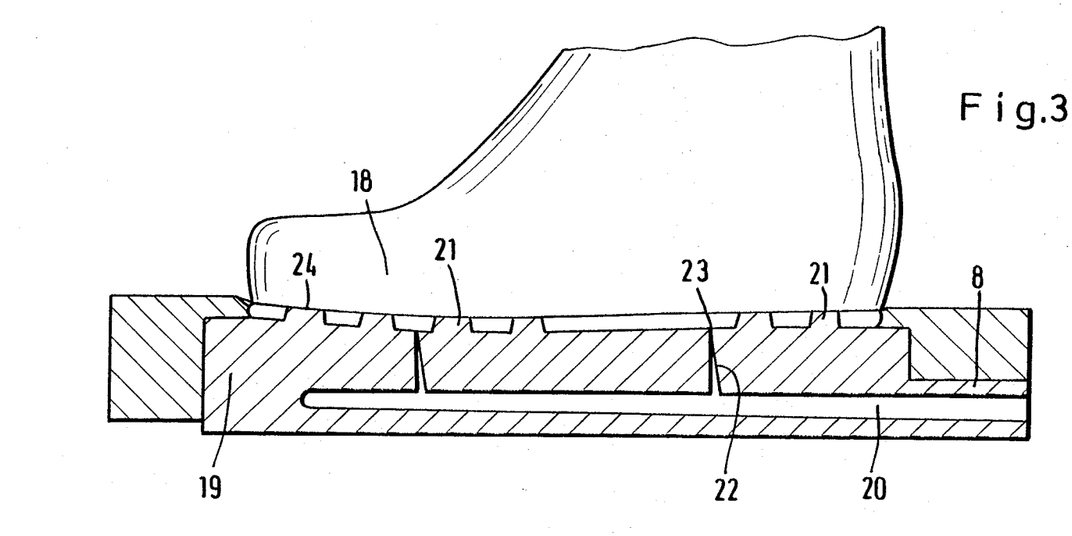
FIG. 3 is a cross-sectional view of a bottom die for producing an outer sole of a sports shoe according to the method of the present invention.

FIG. 3 is a schematic cross-sectional view through the junction plane of the side parts of the mold and through the bottom die 19 which is for molding the outer sole to the uppers 18 of the sports shoe. The bottom die 19 has a central sprue runner 20 which is aligned with the sprue runner of the two side parts of the mold. The bottom die 19 has projections 21 which abut the inner sole 24 of the shoe uppers 18. A hollow space defined by the two side parts of the mold, the inner sole, the bottom die and the opening, allows molding of the outer sole with the recess which complement the projections 21. For this purpose, additional conically tapered sprue runners 22 which extend into the areas forming the outer sole of the bottom die branch off the central sprue runner 20. Because the tapered sprue runners 22 are conically tapered, sharp edges 23 are formed at the borders of the orifice. As a result of these sharp edges 23, the sprue at these edges tears off during the removal of the molded material from the bottom die 19. The bottom die 19 in the case shows a projection 8 which, in its operating position, projects into a complementing recess formed by the two side parts 7 of the mold in their closed position.

Figure 4:
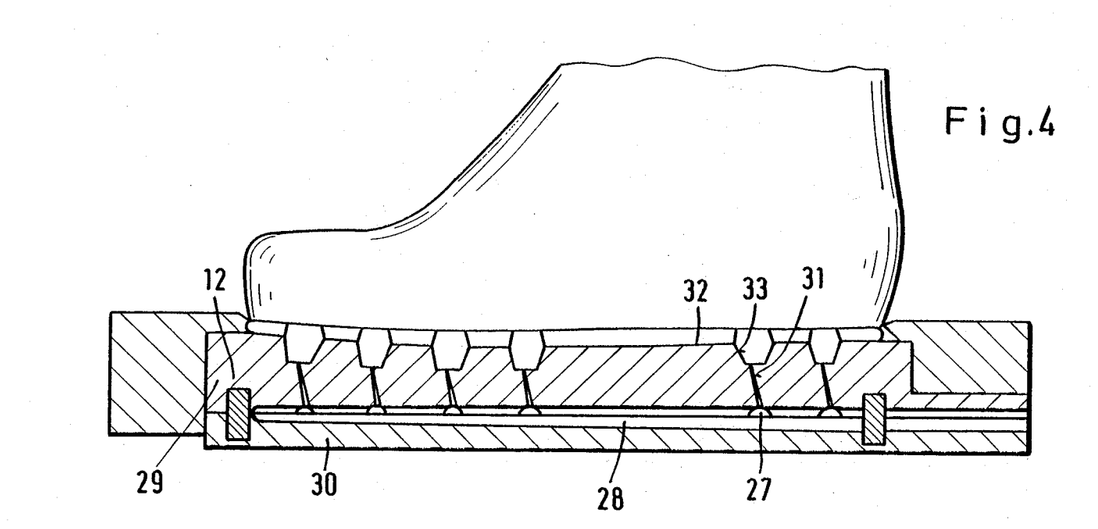
FIG. 4 is a cross-sectional view of a bottom die for producing cleats on a sports shoe having an outer sole formed using the bottom die of FIG. 3.

FIG. 4 is a cross-sectional view of a bottom die 12 as shown in FIG. 2. Die 12 is for the production and molding of the cleats after the sole has been made. The bottom die 12 has a central sprue runner 28 and is divided into two parts 29 and 30 such that the injection plane of the parts cuts across the axis of the central sprue runner. Channel sectors 27 branch off at right angles from the central sprue runner 28 and the axes of the sectors lie in the junction plane with the axis of the central sprue runner. The die part 29 has mold areas 33 which complement the cleats yet to be formed. Conically tapered sprue runners 31 also lead to these molds 33 which branch off the sprue runner channel sector 27. Each tapered sprue runner 31 has a sharp edge 32 so that, when the sprue is pulled, the tapered sprue sectors, tear in the area of the sharp edges.

Figure 5:
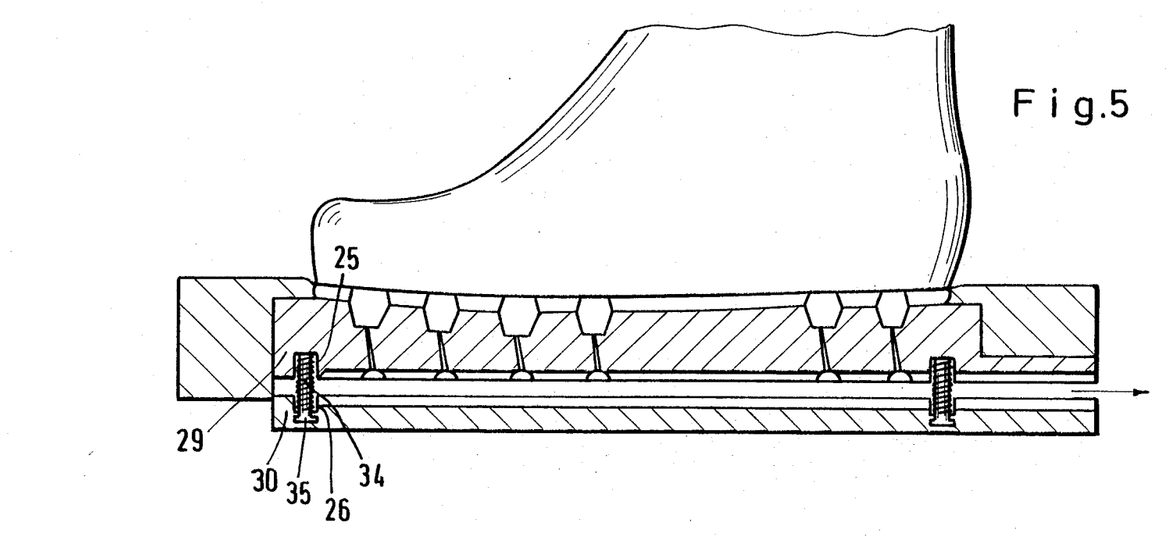
FIG. 5 is a detailed view of the bottom die of FIG. 4.

FIG. 5 shows the bottom die 12 of FIG. 4 in its separated position for pulling the sprue, the soles and cleats having been molded to the shoe uppers with the cleats having a form fitting contact and/or a contact held by pressure with the outer sole and the uppers. The bottom die 12, as already illustrated in FIG. 4, consists of two parts 29 and 30 which are shown in FIG. 5 in their separated position after the injection molding of the cleats. The sprue runner sectors 27 thereby merge into the molds in such a way that they also form sharp edges. By attaching a tension producing device (not shown) to the entire sprue in the direction of the arrow, the sprue tears off. Part 29 includes two bolts 34 having bolt head 35. Part 30 of the bottom die is adjustably guided by the bolts 34, the bolt heads 35 serving as stops. Between the two parts 29 and 30, blind endholes 25 and 26, aligned with one another, have been drilled for the bolts 34 having associated pressure springs. In the operating position, that is after the bottom die 12 has moved into the opening, both parts 29 and 30 are pressed against the resistance of the pressure springs and towards each other and the bottom die aligns with the shoulder of the side parts of the mold.

After the bottom die 12 has been moved out of the opening, the two parts 29 and 30 are forced apart from one another by springs to the maximum preset distance, a distance greater than the diameter of the sprue formed by the central sprue boreholes, to which the sprue, corresponding to the sprue borehole sectors, is molded. Because a greater distance between the two parts 29 and 30 has been created, which corresponds to the diameter of the central sprue boreholes, it is easy to tear off the sprue in the sprue runner from the cleats, because of the sharp edges that have been created, by applying a tractive force in the direction of the arrow and to remove the entire sprue from the bottom die 12 through the gap that has been formed.

Figure 6:
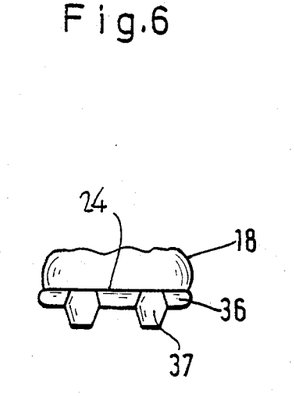
FIG. 6 is a cross-sectional view of a sports shoe according to the present invention.

FIG. 6 is a cross-sectional view of a sports shoe which has been made in accordance with the invention. The shoe comprises the uppers 18, the outer sole 36 and the cleats 37. It is apparent from FIG. 6 that the outer sole 36, cleats 37 and inner sole 24 have a form-fitting connection and/or a connection held together by tension.

Figure 7:
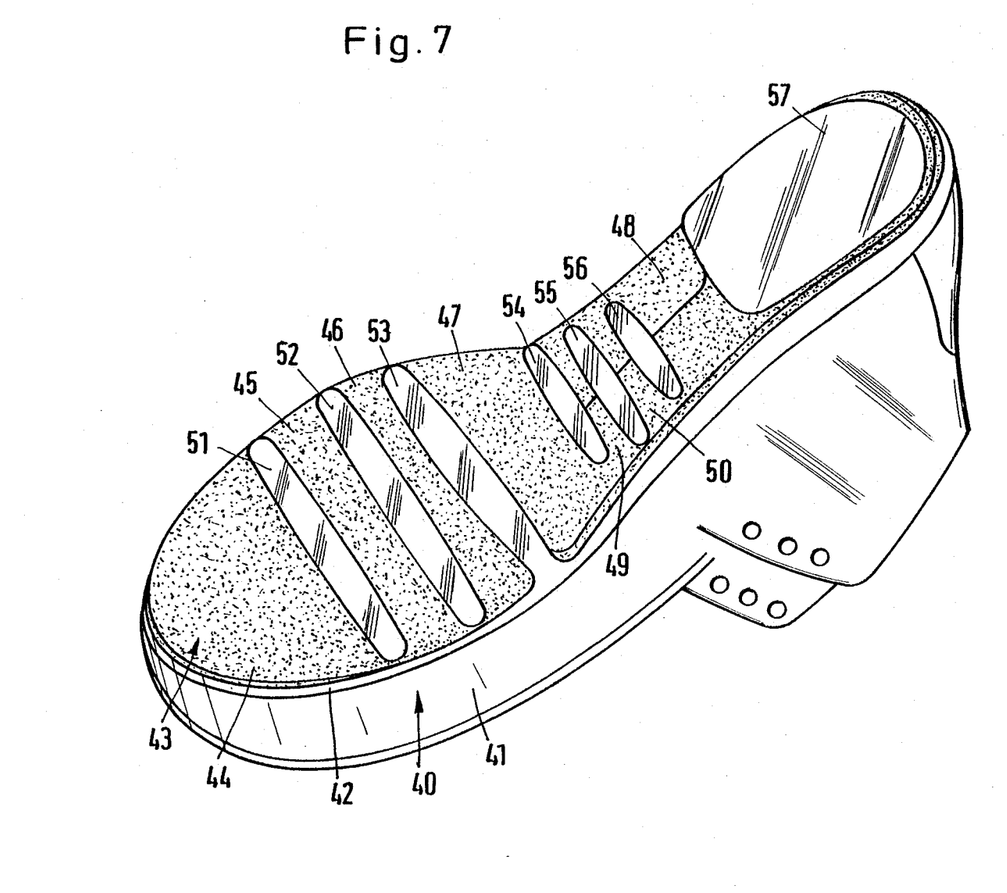
FIG. 7 is a perspective view of a sports shoe having an outer sole and an intermediate sole, the outer sole being subdivided into sections.

According to another aspect of the invention, FIG. 7 shows a perspective view of a shoe 40 which has an upper 41 and an intermediate sole 42. Molded to the intermediate sole 42 is the outer sole 43 which consists of the sections 44 to 50 which are separated from one another through the zones 51 to 57 which are formed by material of the intermediate sole.

As is apparent from FIG. 7, these zones 51-57 and the sole sections 44-50 are flush with one another, that is, they adjoin each other in the same plane. However, zones could also be designed in such a way that their depth is less than that of the sole sections, so that the entire sole surface would have contours.

By varying the dimensions of the sole sections, their separation and the lengths and widths of the zones, as well as by appropriate selection of the properties of the materials for the intermediate sole and the sections of the outer sole, it is possible to adapt the flexibility of the shoe sole to a wide range of applications. Thus, it is possible, for instance, to adjust the flexibility merely by a different combination of materials and their properties in such a way that, by a different combination, a shoe which previously was only suitable for city use, could now also become suitable for hiking in mountainous terrain. To that extent it is no longer necessary to create a different injection mold for a country shoe of the same size. The thickness of the sole sections can also be varied to change the flexibility.

Figure 8:
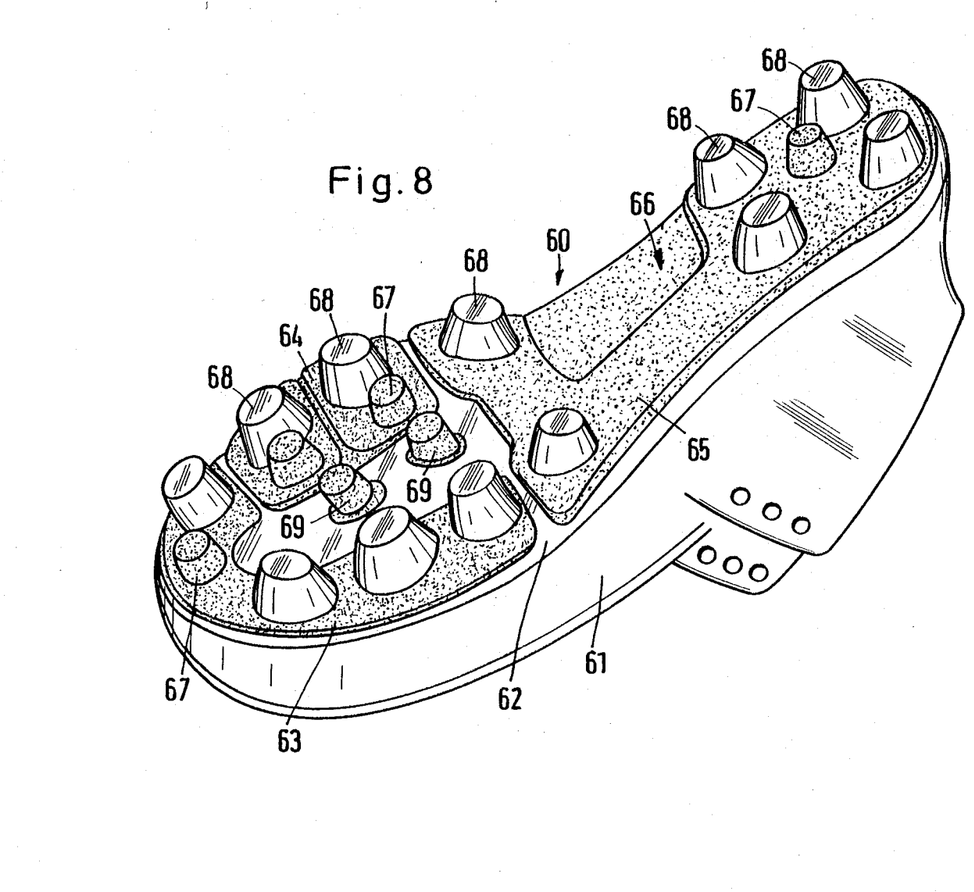
FIG. 8 is a perspective view of a soccer shoe according to the present invention with an intermediate sole and an outer sole subdivided into sections.

FIG. 8 is a perspective view of a soccer shoe 60 which has upper 61 and an intermediate sole 62. The sole sections 63, 64 and 65 of outer sole 66 are molded to the intermediate sole 62. The sole sections 63–65 have cleats 67 while the cleats 68 are made of the material of the intermediate sole 62. In addition, cleats 69 are provided in the zones which separate the sole sections 63, 64 and 65 from one another.

Figure 9:
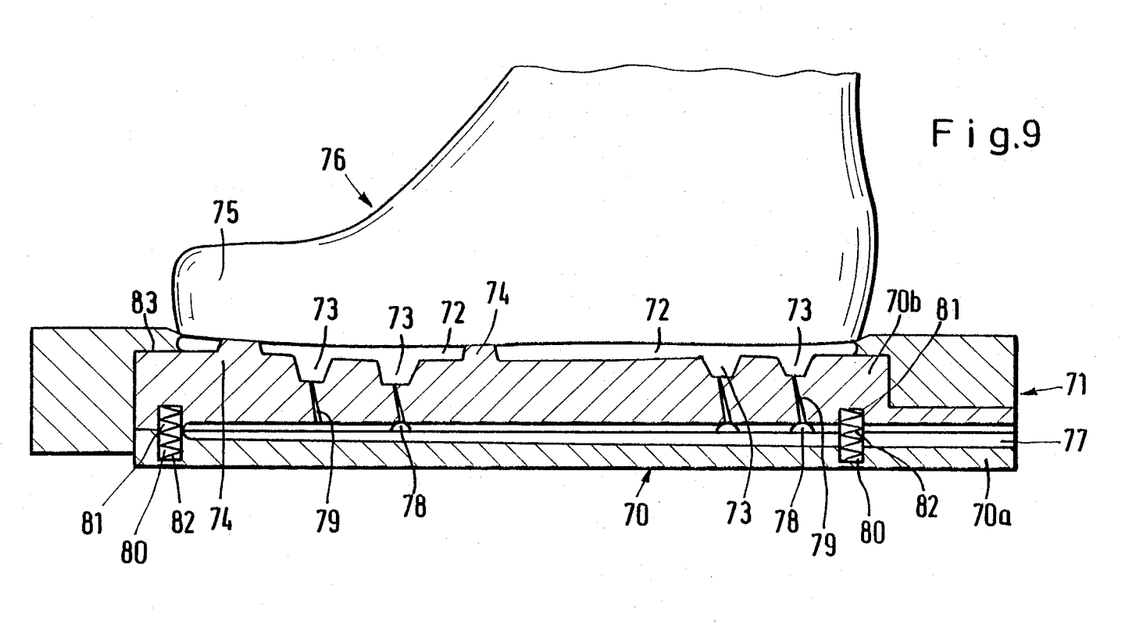
FIG. 9 is a cross-sectional view of a bottom die which is divided into two parts for molding an intermediate sole with cleats to a soccer boot upper according to the present invention.

FIG. 9 is a schematic cross-sectional view through the junction plane of the side parts of a mold and through a bottom die 70, for molding a intermediate sole with cleats to the upper 75 of a soccer boot 76.

Since the sectional view is through the junction plane of the two side parts of the mold, therefore only one side part 71 of the mold is shown. Both side parts 71 in their closed position guide the bottom die 70 which has mold areas 72 and 73 complementing the intermediate sole and its cleats respectively and has projections 74 which complement the cleats of the outer sole, the projections 74 abutting against the inner sole of the uppers 75 of the soccer boot 76.

The bottom die 70 is divided into two parts 70a and 70b at the plane of the central sprue runner 77 for injecting the material for the intermediate sole and its cleats. This plane runs through the axis of the sprue runner 77 and is perpendicular to the plane of the drawing. In this plane are sprue runners 78 which start from the central sprue runner 77 from which conically tapered sprue runner sections 79 branch off and lead to the mold areas 72 and 73. The bottom die 70 comprises the lower bottom die part 70a and the upper bottom die part 70b.

In the position shown in FIG. 9, the side parts of the mold are in the closed position. The bottom die 70 rests against their shoulders 83 and defines, with the uppers 75 of the soccer boot 76 on a last, the hollow mold area for injecting the material for the intermediate sole and its cleats.

After the intermediate sole and the cleats have been formed, the bottom die 70 is relieved of tension. Consequently, the bottom die parts 70a and 70b are forced apart by the pressure springs, so that the entire sprue can be removed from the bottom die 70.

Figure 10:
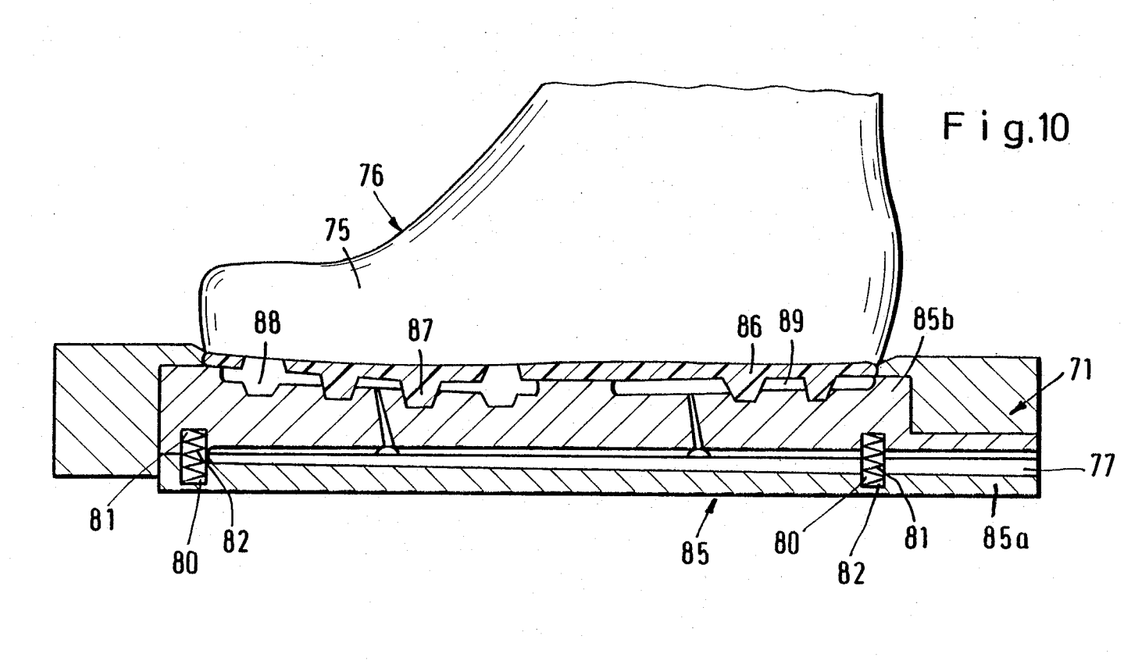
FIG. 10 is a cross-sectional view of a bottom die for molding the sections of the outer sole with cleats to the intermediate sole with cleats which has been formed on the soccer boot upper using the bottom die shown in FIG. 9.

The bottom die 70 for soccer boot 76 with formed intermediate sole 86 and its cleats 87 is then exchanged for the bottom die 85 for molding the sole sections and their cleats as is shown in FIG. 10. Bottom die 85 comprises a lower bottom die part 85a and an upper bottom die part 85b having blind holes 80 and 81 and pressure springs 82. The bottom die 85 used for molding the sole sections and their cleats has mold areas 88 and 89 which respectively complement the sections and the cleats. Mold areas 88 and 89 are connected through sprue runners 90 with the central sprue runner 91 whose axis runs through the junction plane of the bottom die parts 85a and 85b. After the injection of the material for the sole sections and their cleats, the bottom die 85 is relieved of tension. Through action of the springs 82 the bottom die parts 85a and 85b are forced apart so that the sprue can be removed.

The manufacture of athletic shoes or boots with an intermediate sole and an outer sole subdivided into sections can also be accomplished with an appropriately divide bottom die in accordance with FIGS. 9 and 10, without providing any spaces 89 or projections for the cleats.

It is claimed:
1. A shoe comprising shoe uppers having an inner sole, an exterior sole which is molded to the shoe uppers and made out of material that can be injection molded, the exterior sole including an intermediate sole and an outer sole, the outer sole comprising individual sole sections which are separated from one another and which are molded to the intermediate sole, the shoe further including one set of cleats injection molded together with the intermediate sole and molded to the inner sole of the shoe and a second set of cleats injection molded with the outer sole, at least some of the outer sole cleats being molded to the inner sole of the uppers through open spaces in the intermediate sole.

2. A method for manufacturing a shoe comprising providing a shoe upper with an inner sole, molding an intermediate sole with open spaces and cleats to the inner sole in an initial injection molding cycle and molding an outer sole including sole sections separated from one another and having cleats to the inner sole in the area of the open spaces in a second injection molding cycle.

3. An injection mold for making a shoe having an intermediate sole with cleats and having sole sections with cleats over the intermediate sole, the mold comprising two side parts, a last, a first bottom die for injection and molding of the intermediate sole with cleats which provides open spaces for the cleats of the sole sections, the bottom die having mold areas complementary to the intermediate sole and which forms complementary spaces for the cleats of the sole sections and a second bottom die for injection and molding of the sole sections which has complementary mold areas for the sole sections, both dies each having a central sprue runner, are divided into two parts in the center area of the central sprue runner and have sprue runners branching off from the central sprue runner leading to the mold areas.

4. A method of manufacturing shoes having cleats, said method comprising the steps of
 (1) providing an upper which includes an insole,
 (2) moving a first die into contact with said insole, said first die including a plurality of first cavities therein for forming cleats,
 (3) injecting a first molding material into said first cavities of said first die so as to fill said first cavities and to mold a plurality of cleats onto said insole, said cleats having ends remote from said insole,
 (4) moving said first die away from said insole,
 (5) moving a second die toward said insole, said second die including a second cavity therein capable of forming an outer sole on said insole, said second cavity including blind bores for reception of said ends of said cleats,
 (6) injecting a second molding material into said second cavity of said second die so as to mold an outer sole onto said insole, said ends of said cleats extending through said molded outer sole, and
 (7) moving said die away from said outer sole.

5. A cleated shoe which has been made by the steps of
 (1) providing an upper which includes an insole,
 (2) moving a first die into contact with said insole, said first die including a plurality of first cavities therein for forming cleats,
 (3) injecting a first molding material into said first cavities of said first die so as to fill said first cavities and to mold a plurality of cleats onto said insole, said cleats having ends remote from said insole,
 (4) moving said first die away from said insole,
 (5) moving a second die toward said insole, said second die including a second cavity therein capable of forming an outer sole on said insole, said second cavity including blind bores for reception of said ends of said cleats,
 (6) injecting a second molding material into said second cavity of said second die so as to mold an outer sole onto said insole, said ends of said cleats extending through said molded outer sole, and
 (7) moving said die away from said outer sole.

* * * * *